(12) United States Patent
Schroeder

(10) Patent No.: US 12,201,043 B2
(45) Date of Patent: Jan. 21, 2025

(54) SYSTEM AND METHOD FOR DETECTING BENT DISK BLADES ON AN AGRICULTURAL IMPLEMENT

(71) Applicant: CNH Industrial America LLC, New Holland, PA (US)

(72) Inventor: Brittany Schroeder, Bunker Hill, IN (US)

( * ) Notice: Subject to any disclaimer, the term of this patent is extended or adjusted under 35 U.S.C. 154(b) by 241 days.

(21) Appl. No.: 17/991,358

(22) Filed: Nov. 21, 2022

(65) Prior Publication Data
US 2024/0164235 A1 May 23, 2024

(51) Int. Cl.
*A01B 23/00* (2006.01)
*A01B 7/00* (2006.01)
*A01B 61/00* (2006.01)

(52) U.S. Cl.
CPC .............. *A01B 23/00* (2013.01); *A01B 7/00* (2013.01); *A01B 61/00* (2013.01)

(58) Field of Classification Search
CPC ............ A01B 23/00; A01B 7/00; A01B 61/00
See application file for complete search history.

(56) References Cited

U.S. PATENT DOCUMENTS

| | | | | |
|---|---|---|---|---|
| 5,000,268 | A * | 3/1991 | Zimmerman | A01C 15/005 172/240 |
| 5,524,712 | A * | 6/1996 | Balmer | A01B 35/04 172/311 |
| 5,641,026 | A * | 6/1997 | Balmer | A01B 61/046 172/311 |
| 10,051,773 | B2 * | 8/2018 | Kovach | A01B 21/083 |
| 11,927,304 | B2 * | 3/2024 | Sheppard | F16B 2/14 |
| 2022/0304213 | A1 * | 9/2022 | Schroeder | A01B 63/112 |

OTHER PUBLICATIONS

U.S. Appl. No. 17/543,930, filed Dec. 7, 2021.

* cited by examiner

*Primary Examiner* — Gertrude Arthur Jeanglaude
(74) *Attorney, Agent, or Firm* — Rebecca Henkel; Peter K. Zacharias; Richard K. DeMille

(57) ABSTRACT

An agricultural implement includes a disk assembly having a hanger and a disk blade. Furthermore, the agricultural implement includes first and second fasteners coupling the hanger to a frame member of the agricultural implement. Additionally, the agricultural implement includes a first load sensor configured to generate data indicative of a first load being applied to the first fastener by the disk assembly. Moreover, the agricultural implement includes a second load sensor configured to generate data indicative of a second load being applied to the second fastener by the disk assembly. In addition, the agricultural implement includes a computing system configured to determine when the disk blade is bent based on the data generated by the first and second load sensors.

20 Claims, 6 Drawing Sheets

SYSTEM AND METHOD FOR DETECTING BENT DISK BLADES ON AN AGRICULTURAL IMPLEMENT

FIELD OF THE INVENTION

The present disclosure generally relates agricultural implements and, more particularly, to a system and a method for detecting bent disk blades on an agricultural implement.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

In some configurations, a tillage implement includes a plurality of disk blades supported on its frame. In this respect, as the tillage implement travels across the field to perform a tillage operation thereon, the disk blades rotate relative to the soil to cut and size the residue present on the field surface for improved microbial degradation and incorporation into the soil.

During such tillage operations, the disk blades may contact rocks or other buried obstacles. In certain instances, the contact between a disk blade and an obstacle may be sufficient to bend or otherwise damage the disk blade. A bent disk blade may, in turn, negatively impact the quality of the tillage operation being performed and should be replaced as soon as possible. Unfortunately, it can be difficult for an operator to notice a bent disk blade during a tillage operation as the frame and/or the wheels of the tillage implement and/or the associated work vehicle may block the operator's view of the disk blades.

Accordingly, a system and method for detecting bent disk blades on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame extending in a longitudinal direction between a forward end of the frame and an aft end of the frame. The frame further extends in a lateral direction between a first side of the frame and a second side of the frame. Furthermore, the frame includes a frame member. Additionally, the agricultural implement includes a disk assembly supported on the frame, with the disk assembly including a hanger coupled to the frame member and a disk blade rotatably coupled to the hanger. Moreover, the agricultural implement includes first and second fasteners coupling the hanger to the frame member. In addition, the agricultural implement includes a first load sensor in operative association with the first fastener, with the first load sensor configured to generate data indicative of a first load being applied to the first fastener by the disk assembly. Furthermore, the agricultural implement includes a second load sensor in operative association with the second fastener, with the second load sensor configured to generate data indicative of a second load being applied to the second fastener by the disk assembly. Additionally, the agricultural implement includes a computing system communicatively coupled to the first and second load sensors. In this respect, the computing system is configured to determine when the disk blade is bent based on the data generated by the first and second load sensors.

In another aspect, the present subject matter is directed to a system for detecting bent disk blades on an agricultural implement. The system includes a disk assembly configured to be supported on a frame member of a frame of the agricultural implement. The frame, in turn, extends in a longitudinal direction between a forward end of the frame and an aft end of the frame. The frame further extends in a lateral direction between a first side of the frame and a second side of the frame. Furthermore, the disk assembly includes a hanger coupled to the frame member and a disk blade rotatably coupled to the hanger. Additionally, the system includes first and second fasteners configured to couple the hanger to the frame member. Moreover, the system includes a first load sensor in operative association with the first fastener, with the first load sensor configured to generate data indicative of a first load being applied to the first fastener by the disk assembly. In addition, the system includes a second load sensor in operative association with the second fastener, with the second load sensor configured to generate data indicative of a second load being applied to the second fastener by the disk assembly. Furthermore, the system includes a computing system communicatively coupled to the first and second load sensors. As such, the computing system is configured to determine when the disk blade is bent based on the data generated by the first and second load sensors.

In a further aspect, the present subject matter is directed to a method for detecting bent disk blades on an agricultural implement. The agricultural implement, in turn, includes a disk assembly supported on a frame member of the agricultural implement, with the disk assembly including a hanger and a disk blade rotatably coupled to the hanger. The agricultural implement further includes first and second fasteners coupling the hanger to the frame member. The method includes receiving, with a computing system, first load sensor data indicative of a first load being applied to the first fastener by the disk assembly. Furthermore, the method includes receiving, with the computing system, second load sensor data indicative of a second load being applied to the second fastener by the disk assembly. Additionally, the method includes determining, with the computing system, when the disk blade is bent based on the received first and second load sensor data. Moreover, the method includes initiating, with the computing system, a control action when it is determined that the disk blade is bent.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
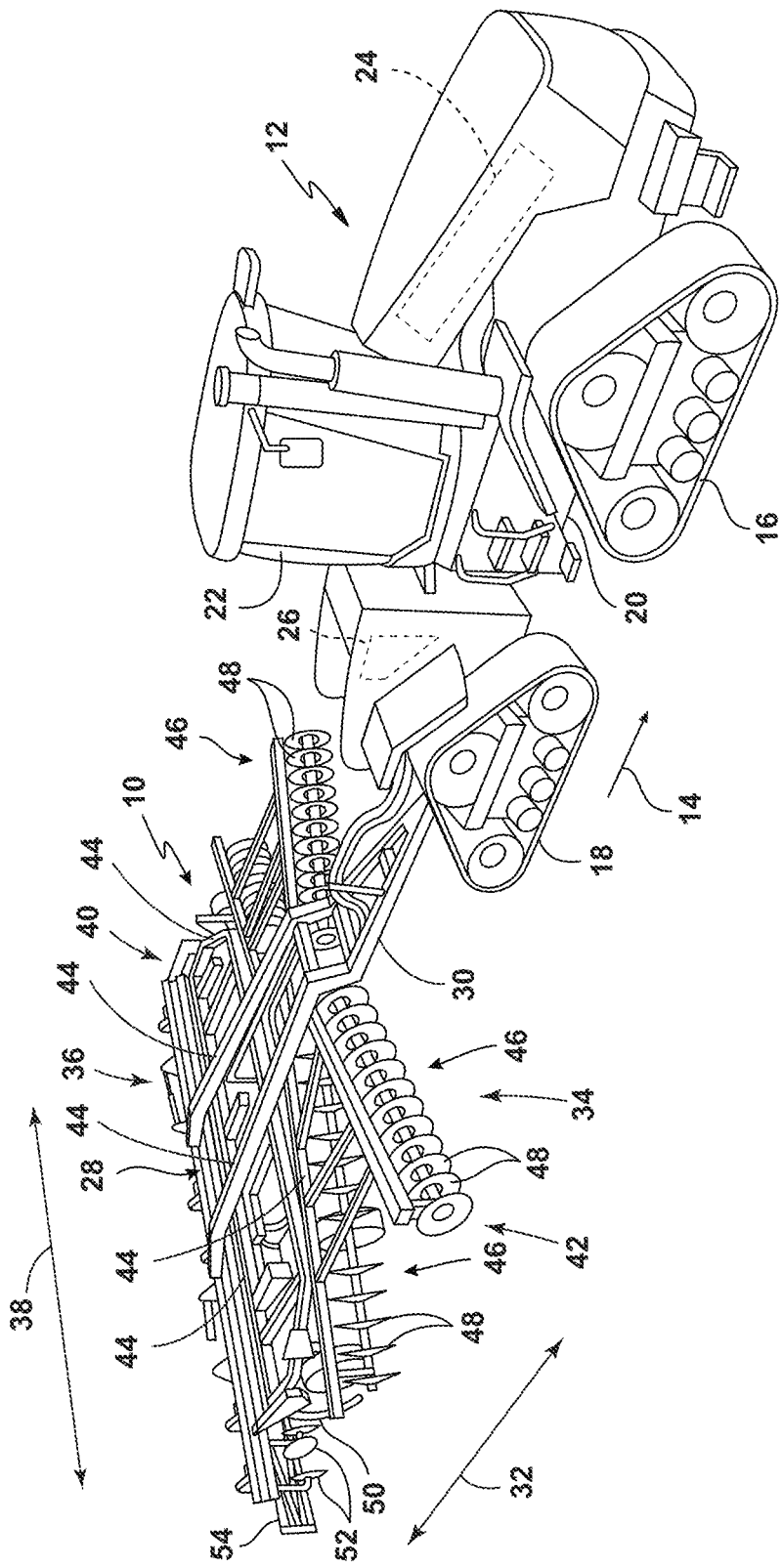
FIG. 1 illustrates a perspective view of one embodiment of an agricultural implement and an associated work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting bent disk blades on an agricultural implement. As will be described below, the agricultural implement includes a disk assembly supported on its frame. The disk assembly, in turn, includes a hanger and a disk blade rotatably coupled to the hanger. Furthermore, the agricultural implement includes first and second fasteners (e.g., first and second U-bolts) coupling the hanger to the frame. For example, the first and second fasteners may extend in a longitudinal direction across the top surface of a frame member from a forward side of the frame member to an aft side of the frame member such that the first and second fasteners are spaced apart from each other in a lateral direction.

In several embodiments, a computing system of the disclosed system is configured to determine when the disk blade is bent based on the loads applied to the first and second fasteners. Specifically, in such embodiments, the system includes a first load sensor configured to generate data indicative of a first load being applied to the first fastener by the disk assembly. Additionally, the system includes a second load sensor configured to generate data indicative of a second load being applied to the second fastener by the disk assembly. In this respect, the computing system is configured to receive the data generated by the first and second load sensors during operation of the agricultural implement. Moreover, the computing system is configured to determine when the disk blade is bent based on received sensor data. For example, in some embodiments, the computing system may determine first and second magnitudes of the first and second loads acting on the first and second fasteners in the lateral direction based on the received sensor data, respectively. Thereafter, when at least one of the first or second magnitudes exceeds a threshold value, the computing system may determine that the disk blade is bent.

Determining when the disk blades of an agricultural implement are bent based on the loads applied to the fasteners coupling the associated disk assembly(ies) to the frame improves the operation of the agricultural implement. More specifically, during normal, non-bent operation of a disk blade, the forces applied to the fasteners coupling the associated disk assembly(ies) to the frame are oriented downward in the vertical direction. However, when a bent disk blade moves through the soil, horizontal forces in the lateral direction are exerted on the fasteners. The magnitude and the direction of such forces in the lateral direction are indicative of the direction and severity of the bending. As such, by monitoring the loads being applied to the fasteners coupling the disk assembly(ies) of an agricultural implement to its frame, the disclosed system and method can automatically determine when the disk blades of the implement are bent. Thus, the disclosed system and method can notify the operator and/or initiate other control actions (e.g., reducing ground speed) immediately upon bending of a disk blade and without the need for the operator to notice such bending, thereby improving the quality of the operation being performed by the agricultural implement.

Referring now to the drawings, FIG. 1 illustrates a perspective view of one embodiment of an agricultural implement 10 and an associated agricultural work vehicle 12 in accordance with aspects of the present subject matter. In general, the agricultural implement 10 is configured to be towed across a field by the work vehicle 12 in a direction of travel (indicated by arrow 14). For example, in one embodiment, the agricultural implement 10 is configured as a tillage implement (e.g., a disk ripper) and the work vehicle 12 is configured as an agricultural tractor. However, in other embodiments, the agricultural implement 10 may be configured as any other suitable agricultural implement, such as another type of tillage implement, a seeder, planter, nutrient applicator, etc. Similarly, the work vehicle 12 may be configured as any other suitable work vehicle, such as an agricultural harvester, a self-propelled sprayer, etc.

As shown, the work vehicle 12 includes a pair of front track assemblies 16, a pair of rear track assemblies 18, and a frame or chassis 20 coupled to and supported by the track assemblies 16, 18. However, in other embodiments, the work vehicle 10 may include any other type of traction devices, such as wheels or tires. An operator's cab 22 may be supported by a portion of the chassis 20 and may house various input devices (e.g., a user interface) for permitting an operator to control the operation of one or more components of the work vehicle 12 and/or one or more components of the agricultural implement 10. Furthermore, the work vehicle 12 includes an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, the agricultural implement 10 includes a frame 28 configured to be towed by the work vehicle 12 via a pull hitch or tow bar 30 in the direction of travel 14. As shown, the frame 28 extends in a longitudinal direction 32 between a forward end 34 of the frame 28 and an aft end 36 of the frame 28. The frame 28 also extends in a lateral direction 38 between a first side 40 of the frame 28 and a second side 42 of the frame 28. In general, the frame 28 may include a plurality of structural frame members 44, such as beams, bars, and/or the like, configured to support or couple to a plurality of components.

Moreover, the frame 28 may be configured to support a plurality of ground-engaging and/or ground-penetrating tools, such as a plurality of shank assemblies, disk blades, leveling blades, basket assemblies, tines, spikes, and/or the like. In one embodiment, the various ground-engaging and/or ground-penetrating tools may be configured to perform a tillage operation or any other suitable ground-engaging operation on the field across which the agricultural implement 10 is being towed. For example, in the illustrated embodiment, the frame 28 is configured to support various assemblies 46 of disk blades 48, a plurality of shank assemblies 50, a plurality of leveling blades 52, and a plurality of crumbler wheels or basket assemblies 54. However, in alternative embodiments, the frame 28 may be configured to support any other suitable ground-engaging tool(s), ground-penetrating tool(s), or combinations of such tools.

Figure 2:
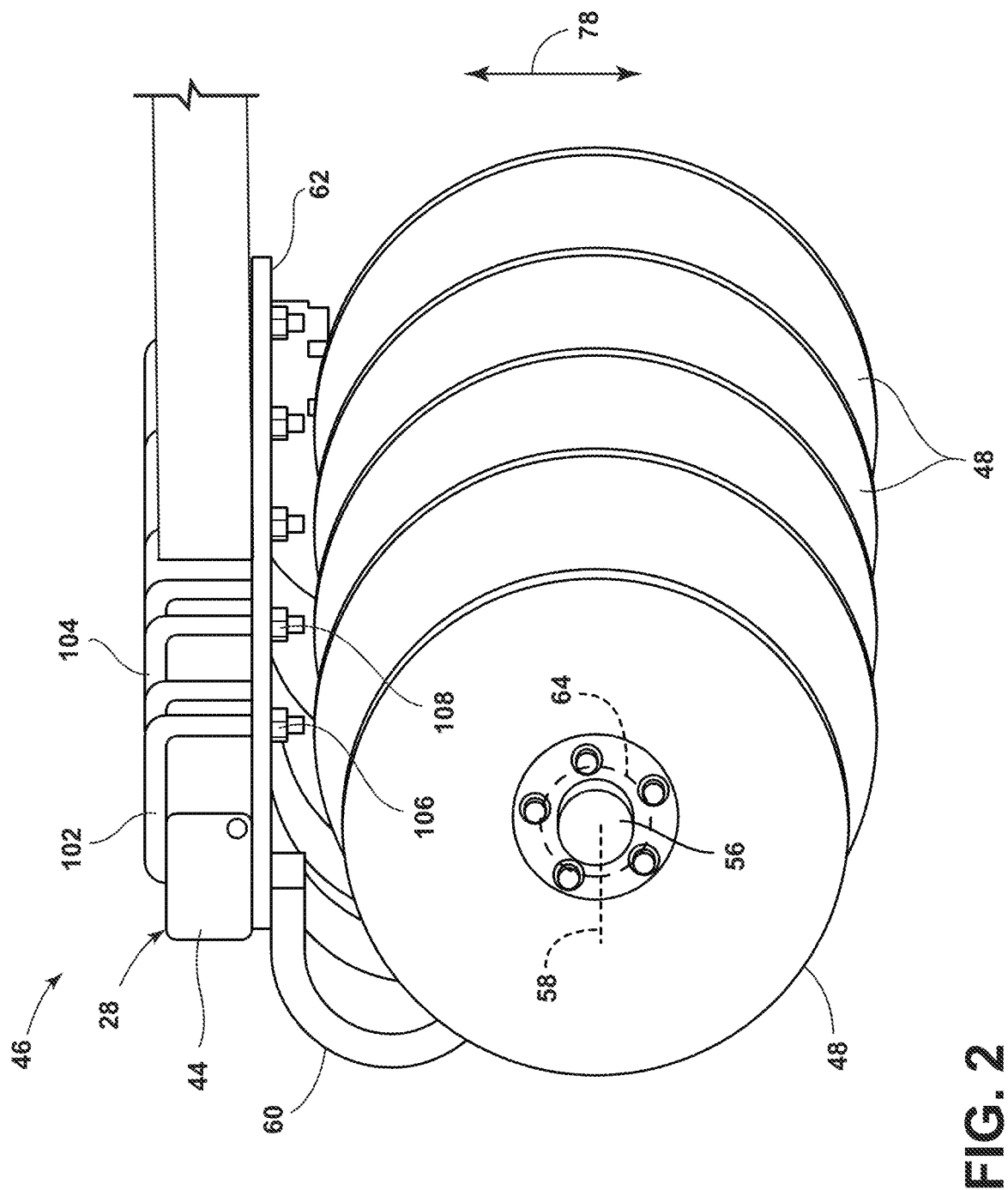
FIG. 2 illustrates a side view of one embodiment of a disk assembly of an agricultural implement in accordance with aspects of the present subject matter.

FIG. 2 illustrates a side view of one of the disk assemblies 46. As shown, in several embodiments, the disk assembly 46 is configured as a disk gang in which several of the disk blades 48 are ganged together or otherwise supported along a single disk gang shaft 56. Specifically, in such embodiments, the disk blades 48 rotatably coupled to and spaced apart from each other along the length of the disk gang shaft 56. As such, the disk blades 48 are generally configured to rotate about an axis 58 defined by the shaft 56. In one embodiment, the disk blades 48 are keyed to the shaft 56 such that all of the disk blades 48 rotate together about the axis 58 with the shaft 56. In other embodiments, the disk blades 48 may rotate independently about the axis 58 relative to the shaft 56. However, in alternative embodiments, the disk assembly 46 may be configured in any other suitable manner. For example, in one embodiment, the disk assembly 46 may include only a single disk blade 48.

Furthermore, the disk assembly 46 includes one or more hangers 60 that are rotatably coupled to the disk blade(s) 48. More specifically, the hanger(s) 60 is configured to support the disk blades 48 relative to the frame member 44. In this respect, each hanger 60 is coupled at one end to the frame member 44 via first and second fasteners 102, 104. For example, as will be described below, each hanger 60 may be coupled to a mounting bracket 62, with the first and second fasteners 102, 104 coupling the mounting bracket 62 to the frame member 44. Additionally, each hanger 60 is rotatably coupled at the opposite end to the disk gang shaft 56, such as via a bearing assembly (e.g., as indicated by dashed circle 64). In the illustrated embodiment, each of the hangers 60 defines a C-shape that permits the disk gang shaft 56 and the disk blades 48 mounted thereon to move relative to the frame member 44. However, in alternative embodiments, the hanger(s) 60 may have any other suitable configuration. Moreover, although the illustrated disk assembly 46 includes three hangers 60, the disk assembly 46 may have any other suitable number of hangers 60. For example, in embodiments in which the disk assembly 46 includes a single disk blade 48, the disk assembly 46 may similarly include a single hanger 60.

During an agricultural operation (e.g., a tillage operation), the disk blades 48 penetrate into and rotate relative to the soil as the agricultural implement 10 is towed across the field. When a disk blade 48 contacts a rock or other buried obstacle, the C-shape configuration of the corresponding hanger(s) 60 allows the disk blade 48 and the disk gang shaft 56 to pivot upward and out of the way of the buried obstacle, thereby preventing bending of or other damage to the disk blade 48. However, in some instances, such upward movement may not be sufficient to prevent damage to the disk blade 48. For example, in certain instances, the contact between the disk blade 48 and the buried obstacle may be severe enough to bend the disk blade 48. As will be described below, the system and method disclosed herein will automatically detect when a disk blade 48 is bent and alert the operator to the bent disk blade 48.

Figure 3:
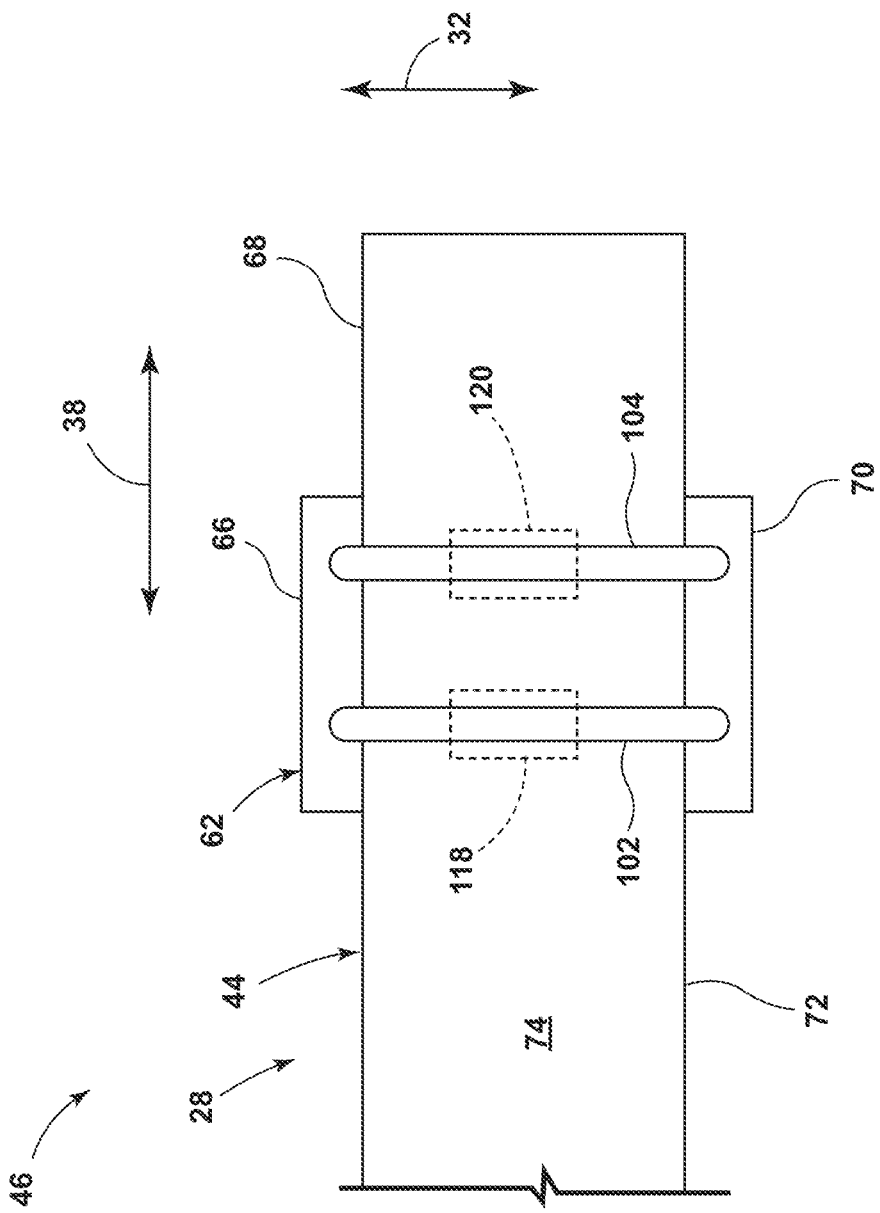
FIG. 3 illustrates a partial top view of the disk assembly shown in FIG. 2, particularly illustrating first and second fasteners coupling the disk assembly to a frame member of the agricultural implement.

FIG. 3 illustrates a partial top view of the disk assembly 46 shown in FIG. 2, with the disk blades 46 and hangers 60 removed for clarity. As shown, the mounting bracket 62 is coupled to one of the frame members 44 via the first and second fasteners 102, 104, thereby mounting the disk assembly 46 on the frame 28. Specifically, in several embodiments, the mounting bracket 62 includes a forward portion 66 positioned adjacent to a forward side 68 of the frame member 44. Moreover, in such embodiments, the mounting bracket 62 includes an aft portion 70 positioned adjacent to an aft side 72 of the frame member 44. However, in alternative embodiments, the mounting bracket 62 of the disk assembly 46 may have any other suitable configuration that allows for coupling to the frame member 44 via the first and second fasteners 102, 104.

Furthermore, the first and second fasteners 102, 104 extend between the forward and aft portions 66, 70 of the mounting bracket 62 to couple the disk assembly 46 to the frame member 44. Specifically, in several embodiments, the first fastener 102 extends in the longitudinal direction 32 across a top surface 74 of the frame member 44 from the forward side 68 to the aft side 72. Similarly, the second fastener 104 extends in the longitudinal direction 32 across the top surface 74 of the frame member 44 from the forward side 68 to the aft side 72. Moreover, as shown, the first and second fasteners 102, 104 are spaced apart from each other in the lateral direction 38. Thus, the first and second fasteners 102, 104 generally support the disk assembly 46 relative to the frame 28.

In the illustrated embodiment, the first and second fasteners 102, 104 are configured as U-bolts. In such an embodiment, the first and second fasteners 102, 104 wrap around the forward side 68, the top surface 74, and the aft side 72 of the frame member 44. Moreover, in such embodiments, the first and second fasteners 102, 104 may extend through the mounting bracket 62. As such, first and second nuts 106, 108 (FIG. 2) may threading engage the portions of the first and second fasteners 102, 104 positioned beneath the mounting bracket 62, respectively, to secure mounting bracket 62 to the frame member 44. However, in alternative embodiments, the first and second fasteners 102, 104 may be configured as any other suitable type of fasteners.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of agricultural implement and/or work vehicle configuration.

Additionally, as shown in FIG. 3, the agricultural implement 10 includes first and second load sensors 118, 120. More specifically, the first load sensor 118 is in operative association with the first fastener 102. As such, the first load sensor 118 is configured to generate data indicative of a first load being applied to the first fastener 102 by the disk assembly 46. Similarly, the second load sensor 120 is in operative association with the second fastener 104. As such, the second load sensor 120 is configured to generate data indicative of a second load being applied to the second fastener 104 by the disk assembly 46. As will be described below, the data generated by the first and second load sensors 118, 120 is used to determine when any of the disk blades 48 of the disk assembly 46 are bent.

The first and second load sensors 118, 120 may be configured as any suitable sensors or sensing devices configured to generate data indicative of the loads being applied to or otherwise acting on the first and second fasteners 102, 104. For example, in some embodiments, the first and second load sensors 118, 120 are configured as first and second multi-axial load cells, respectively. In such embodiments, each load sensor 118, 120 detects the load being applied to the corresponding fastener 102, 104 along a first axis (e.g., an x-axis) generally oriented parallel to the lateral direction 38 and along a second axis (e.g., a y-axis) generally oriented parallel to a vertical direction 78 (FIG. 2). However, in alternative embodiments, the first and second load sensors 118, 120 may be configured as any other suitable type of sensors or sensing devices, such as load pins, strain gauges, etc.

Figure 4:
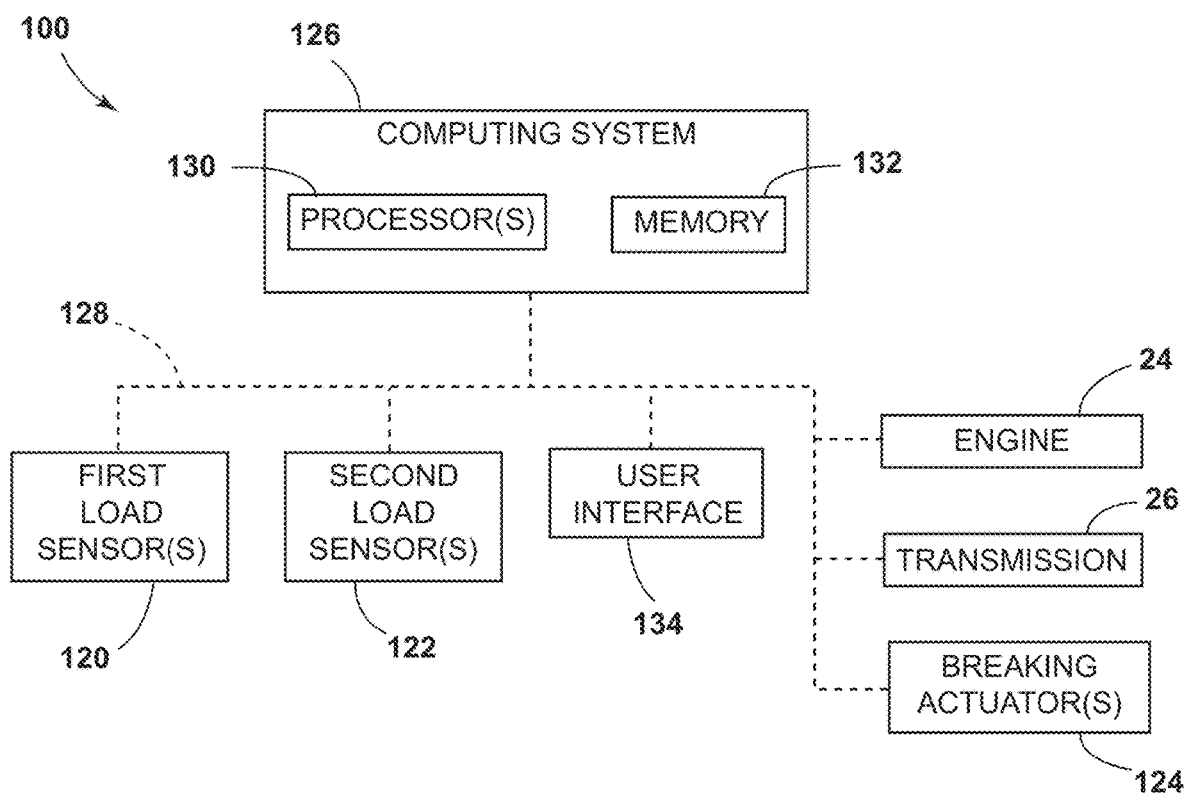
FIG. 4 illustrates a schematic view of one embodiment of a system for detecting bent disk blades on an agricultural implement in accordance with aspects of the present subject matter.

Referring now to FIG. 4, a schematic view of one embodiment of a system 100 for detecting bent disk blades on an agricultural implement is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration.

As shown in FIG. 4, the system 100 includes one or more components of the agricultural implement 10 and/or the work vehicle 12. For example, in the illustrated embodiment, the system 100 includes the engine 24, the transmission 26, the first load sensor(s) 118, and the second load sensor(s) 120.

Additionally, the system 100 may include one or more braking actuators 124 of the work vehicle 12. In general, when activated, the braking actuator(s) 124 may reduce the speed at which the work vehicle 12 moves across the field, such as by converting energy associated with the movement of the work vehicle 12 into heat. For example, in one embodiment, the braking actuator(s) 124 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 124 may be any other suitable hydraulic, pneumatic, mechanical, and/or electrical component(s) configured to convert the rotation of the rotating element(s) into heat. In addition, in embodiments in which speed control can be actuated by the throttle body position, the braking actuator(s) 124 may be omitted.

Moreover, the system 100 includes a computing system 126 communicatively coupled to one or more components of the agricultural implement 10, the work vehicle 12, and/or the system 100 to allow the operation of such components to be electronically or automatically controlled by the computing system 126. For instance, the computing system 126 may be communicatively coupled to the first and second load sensors 118, 120 via a communicative link 128. As such, the computing system 126 may be configured to receive data from the first and second sensors 118, 120 that is indicative of the loads being applied to the first and second fasteners 102, 104 coupling the disk assembly(ies) 46 to the frame 28. Furthermore, the computing system 126 may be communicatively coupled to the engine 24, the transmission 26, and/or the braking actuator(s) 124 via the communicative link 128. In this respect, the computing system 126 may be configured to control the operation of the engine 24, the transmission 26, and/or the braking actuator(s) 124 to adjust the ground speed at which the agricultural implement 10 travels across the field. In addition, the computing system 126 may be communicatively coupled to any other suitable components of the agricultural implement 10, the work vehicle 12, and/or the system 100.

In general, the computing system 126 may comprise one or more processor-based devices, such as a given controller or computing device or any suitable combination of controllers or computing devices. Thus, in several embodiments, the computing system 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 132 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 132 may generally be configured to store suitable computer-readable instructions that, when implemented by the processor(s) 130, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, an implement controller, and/or the like.

In addition, the system 100 may also include a user interface 134. More specifically, the user interface 134 may be configured to provide feedback from the computing system 126 (e.g., feedback associated with bending of the disk blade(s) 48) to the operator. As such, the user interface 134 may include one or more feedback devices (not shown), such as display screens, speakers, warning lights, and/or the like, which are configured to provide feedback from the computing system 126 to the operator. As such, the user interface 134 may, in turn, be communicatively coupled to the computing system 126 via the communicative link 128 to permit the feedback to be transmitted from the computing system 126 to the user interface 134. Furthermore, some embodiments of the user interface 134 may include one or more input devices, such as touchscreens, keypads, touchpads, knobs, buttons, sliders, switches, mice, microphones, and/or the like, which are configured to receive inputs from the operator. In one embodiment, the user interface 134 may be mounted or otherwise positioned within the cab 22 of the work vehicle 12. However, in alternative embodiments, the user interface 134 may mounted at any other suitable location.

Figure 5:
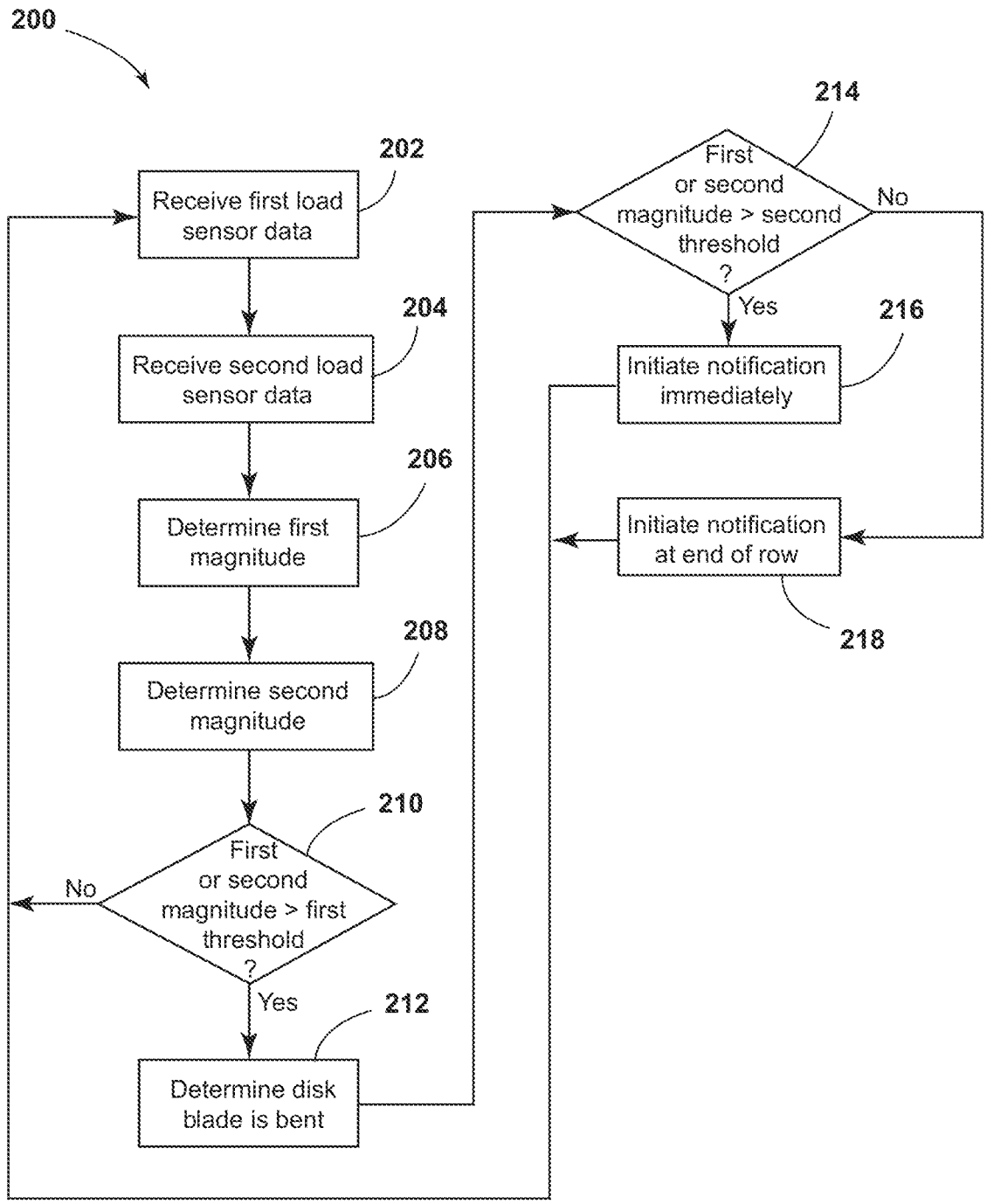
FIG. 5 illustrates a flow diagram providing one embodiment of control logic for detecting bent disk blades on an agricultural implement in accordance with aspects of the present subject matter.

Referring now to FIG. 5, a flow diagram of one embodiment of example control logic 200 that may be executed by the computing system 126 (or any other suitable computing system) for detecting bent disk blades on an agricultural implement is illustrated in accordance with aspects of the present subject matter. Specifically, the control logic 200 shown in FIG. 5 is representative of steps of one embodiment of an algorithm that can be executed to automatically detect bent disk blades on an agricultural implement. Thus, in several embodiments, the control logic 200 may be advantageously utilized in association with a system installed on or forming part of an agricultural implement and/or an associated work vehicle to allow for real-time detection of bent disk blades on an agricultural implement without requiring substantial computing resources and/or processing time. However, in other embodiments, the control logic 200 may be used in association with any other suitable system, application, and/or the like for detecting bent disk blades on an agricultural implement.

As shown, at (202), the control logic 200 includes receiving first load sensor data indicative of a first load being applied to a first fastener by a disk assembly of an agricultural implement. Specifically, as mentioned above, in several embodiments, the computing system 126 may be communicatively coupled to the first load sensor(s) 118 via the communicative link 128. In this respect, as the agricultural implement 10 is towed across the field by the work vehicle 12 to perform an agricultural operation (e.g., a tillage operation) thereon, the computing system 126 may receive data from the first load sensor(s) 118. Such first load sensor data may, in turn, be indicative of the load being applied to each first fastener 102 of the agricultural implement 10 by the corresponding disk assembly 46.

Furthermore, at (204), the control logic 200 includes receiving second load sensor data indicative of a second load being applied to a second fastener by the disk assembly. Specifically, as mentioned above, in several embodiments, the computing system 126 may be communicatively coupled to the second load sensor(s) 120 via the communicative link 128. In this respect, as the agricultural implement 10 is towed across the field by the work vehicle 12 to perform the agricultural operation, the computing system 126 may receive data from the second load sensor(s) 120. Such second load sensor data may, in turn, be indicative of the load being applied to each second fastener 104 of the agricultural implement 10 by the corresponding disk assembly 46.

As will be described below, the first load sensor data received at (202) and the second load sensor data received at (204) are used to detect when the disk blades 48 of the agricultural implement 10 are bent. Specifically, in several embodiments, the first and second load sensors 118, 120 are configured as multi-axial load cells. In such embodiments, the first and second load sensors 118, 120 generate data indicative of the loads being applied to each pair of first and second fasteners, 102, 104 by the corresponding disk assembly in the lateral direction 38 (e.g., the x-axis) and in the vertical direction 78 (the y-axis). During normal, unbent operation of a disk blade 48, an upward load in the vertical direction 78 is applied to the corresponding pair of first and second fasteners 102, 104, with an at most negligible load being applied in the lateral direction 38. However, when the disk blade 48 is bent toward the first side 40 of the frame 28, a load in the lateral direction 38 that is directed toward the first side 40 is applied to the corresponding pair of first and second fasteners 102, 104. Similarly, when the disk blade 48 is bent toward the second side 42 of the frame 28, a load in the lateral direction 38 that is directed toward the second side 42 is applied to the corresponding pair of first and second fasteners 102, 104. The magnitude of the load being applied to the pair of first and second fasteners 102, 104 in the lateral direction 38 is, in turn, indicative of the magnitude of the bending of the disk blade 48.

In this respect, at (206), the control logic 200 includes determining a first magnitude of the first load acting on the first fastener in the lateral direction based on the received first load sensor data. Specifically, in several embodiments, the computing system 126 is configured to analyze the first load sensor data received at (202) to determine the first magnitude of the first load acting on the first fastener 102 coupling each disk assembly 46 to the frame 28. For example, the computing system 126 may access a look-up table stored within its memory device(s) 132 that correlates the received first load sensor data to the corresponding first magnitude(s).

Additionally, at (208), the control logic 200 includes determining a second magnitude of the second load acting on the second fastener in the lateral direction based on the received second load sensor data. Specifically, in several embodiments, the computing system 126 is configured to analyze the second load sensor data received at (204) to determine the second magnitude of the second load acting on the second fastener 104 coupling each disk assembly 46 to the frame 28. For example, the computing system 126 may access a look-up table stored within its memory device(s) 132 that correlates the received second load sensor data to the corresponding second magnitude(s).

Moreover, at (210), the control logic 200 includes comparing the determined first and second magnitudes to a first threshold value. Specifically, in several embodiments, the computing system 126 is configured to compare each first magnitude determined at (206) and each second magnitude determined at (208) to a first threshold value. When both of the first and second magnitudes for a given set of the first and second fasteners 102, 104 fall below the first threshold value, the corresponding disk blade(s) 48 is not bent. In such instances, the control logic 200 (with respect to that disk blade(s) 48) returns to (202). Conversely, when at least one of the first and second magnitudes for a given set of the first and second fasteners 102, 104 exceeds the first threshold value, the corresponding disk blade(s) 48 is bent. In such instances, the control logic 200 (with respect to that disk blade(s) 48) proceeds to (212) at which the computing system 126 determines that the corresponding disk blade(s) 48 is bent.

After it is determined at (212) that one or more of the disk blades 48 of the agricultural implement 10 are bent, the computing system 126 may be configured to initiate one or more control actions. For example, in some embodiments, the computing system 126 may be configured to initiate notification of the operator of the implement 10 that one or more of the disk blades 48 are bent. In such embodiments, the computing system 126 may transmit control signals to the user interface 134 via the communicative link 128. Such control signals may, in turn, instruct the user interface 134 to provide a visual or audible notification to the operator that one or more of the disk blades 48 are bent. In one embodiment, the notification may indicate which disk assembly(ies) have bent disk blades 48.

Additionally, or alternatively, after it is determined at (212) that one or more of the disk blades 48 of the agricultural implement 10 are bent, the computing system 126 may be configured to adjust the ground speed of the agricultural implement 10 (e.g., reduce the ground speed of or stop the implement 10). For example, the computing system 126 may transmit control signals to the engine 24, the transmission 26, and/or the braking actuator(s) 124 via the communicative link 128. Such control signals may, in turn, instruct the engine 24, the transmission 26, and/or the braking actuator(s) 124 to adjust the ground speed of the work vehicle 12 and, thus, the agricultural implement 10 (e.g., reduce the ground speed of or stop the implement 10). Moreover, other automatic control actions (e.g., adjusting force being applied to and/or the penetration depth of the disk assembly(ies)) may be initiated after it is determined that one or more of the disk blades 48 are bent.

In this respect, at (214), the control logic 200 includes comparing the determined first and second magnitudes to a second threshold value. Specifically, in several embodiments, the computing system 126 is configured to compare each first magnitude determined at (206) and each second magnitude determined at (208) to a second threshold value, with the second threshold value being greater than the first threshold value. When both of the first and second magnitudes for a given set of the first and second fasteners 102, 104 fall below the second threshold value, the corresponding disk blade(s) 48 is bent, but not severely. In such instances, the control logic 200 (with respect to that disk blade(s) 48) proceeds to (218). Conversely, when at least one of the first and second magnitudes for a given set of the first and second fasteners 102, 104 exceeds the second threshold value, the corresponding disk blade(s) 48 is severely bent. In such instances, the control logic 200 (with respect to that disk blade(s) 48) proceeds to (216).

At (218), the control logic 200 includes initiating notification of the operator after the agricultural implement has reached an end of a pass across the field. As mentioned above, the control logic 200 proceeds (with respect to a given disk blade(s) 48) to (218) when the given disk blade(s) 48 is bent, but not severely bent. In such instances, it is not necessary to immediately notify the operator. Instead, the computing system 126 initiates notification of the operator after the agricultural implement 10 has reached an end of the pass being made across the field. Upon completion of (218), the control logic 200 returns to (202).

Conversely, at (216), the control logic 200 includes initiating notification of the operator immediately. As mentioned above, when the control logic 200 proceeds (with respect to a given disk blade(s) 48) to (216) when the given disk blade(s) 48 is severely bent. In such instances, it may be necessary to immediately notify the operator. As such, the computing system 126 immediately initiates notification of the operator. Upon completion of (216), the control logic 200 returns to (202).

Figure 6:
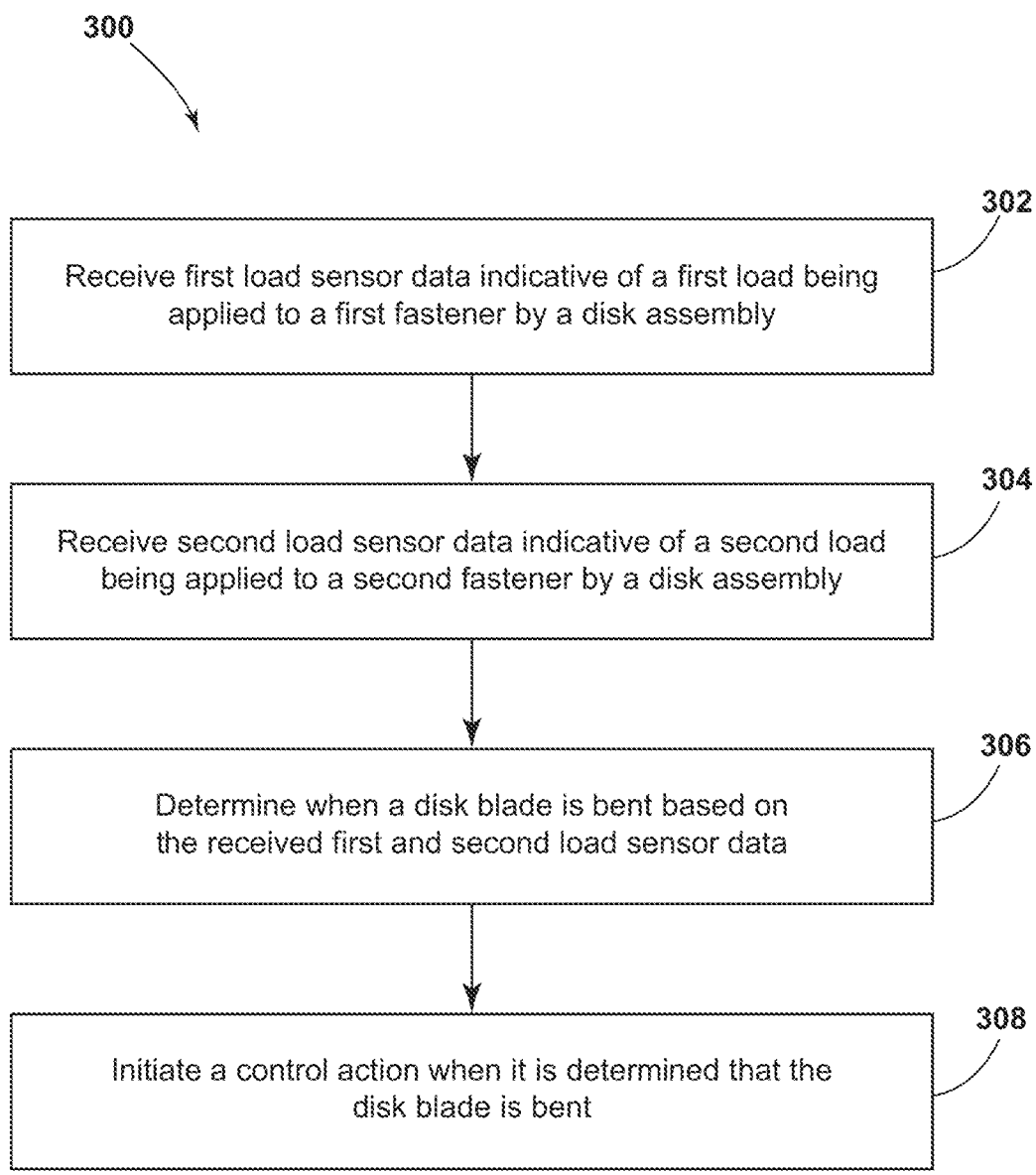
FIG. 6 illustrates a flow diagram of one embodiment of a method for detecting bent disk blades on an agricultural implement in accordance with aspects of the present subject matter.

Referring now to FIG. 6, a flow diagram of one embodiment of a method 300 for detecting bent disk blades on an agricultural implement is illustrated in accordance with aspects of the present subject matter. In general, the method 300 will be described herein with reference to the agricultural implement 10, the work vehicle 12, and the system 100 described above with reference to FIGS. 1-5. However, it should be appreciated by those of ordinary skill in the art that the disclosed method 300 may generally be implemented with any agricultural implement having any suitable implement configuration, with any work vehicle having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, first load sensor data indicative of a first load being applied to a first fastener by a disk assembly of an agricultural implement. For instance, as described above, the computing system 126 may be configured to receive first load sensor data from the first load sensor(s) 118 via the communicative link 128. The received first load sensor data is, in turn, indicative of a first load(s) being applied to the first fastener(s) 102 by the disk assembly(ies) 46.

Furthermore, at (304), the method 300 includes receiving, with a computing system, second load sensor data indicative of a second load being applied to a second fastener by the disk assembly. For instance, as described above, the computing system 126 may be configured to receive second load sensor data from the second load sensor(s) 120 via the communicative link 128. The received second load sensor data is, in turn, indicative of a second load(s) being applied to the second fastener(s) 104 by the disk assembly(ies) 46.

Additionally, at (306), the method 300 includes determining, with the computing system, when the disk blade is bent based on the received first and second load sensor data. For instance, as described above, the computing system 126 may be configured to analyze the received first and second load sensor data to determine when one or more of the disk blade(s) 48 are bent.

Moreover, at (308), the method 300 includes initiating, with the computing system, a control action when it is determined that the disk blade is bent. For instance, as described above, the computing system 126 may be configured to initiate one or more control actions when it is determined that one or more of the disk blade(s) 48 are bent. Such control action(s) may include providing a notification to the operator, adjusting the ground speed of the agricultural implement 10, and/or the like.

It is to be understood that the steps of the control logic 200 and the method 300 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200 and the method 300, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
a frame extending in a longitudinal direction between a forward end of the frame and an aft end of the frame, the frame further extending in a lateral direction between a first side of the frame and a second side of the frame, the frame including a frame member;
a disk assembly supported on the frame, the disk assembly including a hanger coupled to the frame member and a disk blade rotatably coupled to the hanger;
first and second fasteners coupling the hanger to the frame member;
a first load sensor in operative association with the first fastener, the first load sensor configured to generate data indicative of a first load being applied to the first fastener by the disk assembly;
a second load sensor in operative association with the second fastener, the second load sensor configured to generate data indicative of a second load being applied to the second fastener by the disk assembly; and
a computing system communicatively coupled to the first and second load sensors, the computing system configured to determine when the disk blade is bent based on the data generated by the first and second load sensors.

2. The agricultural implement of claim 1, wherein:
the frame member comprises a forward side and an aft side;
the first fastener extending in the longitudinal direction across a top surface of the frame member from the forward side to the aft side; and
the second fastener extending in the longitudinal direction across the top surface of the frame member from the forward side to the aft side such that the first and second fasteners are spaced apart from each other in the lateral direction.

3. The agricultural implement of claim 2, wherein the first fastener comprises a first U-bolt and the second fastener comprises a second U-bolt.

4. The agricultural implement of claim 1, wherein, when determining when the disk blade is bent, the computing system is configured to:
determine a first magnitude of the first load acting on the first fastener in the lateral direction based on the data generated by the first load sensor; and
determine a second magnitude of the second load acting on the second fastener in the lateral direction based on the data generated by the second load sensor.

5. The agricultural implement of claim 4, wherein, when determining when the disk blade is bent, the computing system is further configured to:
compare the first magnitude to a threshold value;
compare the second magnitude to the threshold value; and
determine that the disk blade is bent when at least one of the first magnitude or the second magnitude exceeds the threshold value.

6. A system for detecting bent disk blades on an agricultural implement, the system comprising:
a disk assembly supported on a frame member of a frame of the agricultural implement, the frame extending in a longitudinal direction between a forward end of the frame and an aft end of the frame, the frame further extending in a lateral direction between a first side of the frame and a second side of the frame, the disk assembly including a hanger coupled to the frame member and a disk blade rotatably coupled to the hanger;
first and second fasteners coupling the hanger to the frame member;
a first load sensor in operative association with the first fastener, the first load sensor configured to generate data indicative of a first load being applied to the first fastener by the disk assembly;
a second load sensor in operative association with the second fastener, the second load sensor configured to generate data indicative of a second load being applied to the second fastener by the disk assembly; and
a computing system communicatively coupled to the first and second load sensors, the computing system configured to determine when the disk blade is bent based on the data generated by the first and second load sensors.

7. The system of claim 6, wherein:
the frame member comprises a forward side and an aft side;
the first fastener extending in the longitudinal direction across a top surface of the frame member from the forward side to the aft side; and
the second fastener extending in the longitudinal direction across the top surface of the frame member from the forward side to the aft side such that the first and second fasteners are spaced apart from each other in the lateral direction.

8. The system of claim 6, wherein, when determining when the disk blade is bent, the computing system is configured to:
determine a first magnitude of the first load acting on the first fastener in the lateral direction based on the data generated by the first load sensor; and
determine a second magnitude of the second load acting on the second fastener in the lateral direction based on the data generated by the second load sensor.

9. The system of claim 8, wherein, when determining when the disk blade is bent, the computing system is further configured to:
compare the first magnitude to a threshold value;
compare the second magnitude to the threshold value; and
determine that the disk blade is bent when at least one of the first magnitude or the second magnitude exceeds the threshold value.

10. The system of claim 6, wherein, when it is determined that the disk blade is bent, the computing system is further configured to initiate a control action.

11. The system of claim 10, wherein the control action comprises notifying an operator of the agricultural implement that the disk blade is bent.

12. The system of claim 10, wherein the control action comprises adjusting a ground speed of the agricultural implement.

13. The system of claim 9, wherein:
the threshold value corresponds to a first threshold value; and
after it is determined that the disk blade is bent, the computing system is configured to:
compare the first magnitude to a second threshold value that is greater than the first threshold value; and
compare the second magnitude to the second threshold value.

14. The system of claim 13, wherein the computing system is further configured to:
initiate notification of an operator of the agricultural implement immediately when at least one of the first magnitude or the second magnitude exceeds the second threshold value; and
initiate notification of the operator after the agricultural implement has reached an end of a pass across a field when the first magnitude and the second magnitude fall below the second threshold value.

15. A method for detecting bent disk blades on an agricultural implement, the agricultural implement includes a disk assembly supported on a frame member of the agricultural implement, the disk assembly including a hanger and a disk blade rotatably coupled to the hanger, the agricultural implement further including first and second fasteners coupling the hanger to the frame member, the method comprising:
receiving, with a computing system, first load sensor data indicative of a first load being applied to the first fastener by the disk assembly;
receiving, with the computing system, second load sensor data indicative of a second load being applied to the second fastener by the disk assembly;
determining, with the computing system, when the disk blade is bent based on the received first and second load sensor data; and
initiating, with the computing system, a control action when it is determined that the disk blade is bent.

16. The method of claim 15, wherein determining when the disk blade is bent comprises:
determining, with the computing system, a first magnitude of the first load acting on the first fastener in the lateral direction based on the received first load sensor data; and
determining, with the computing system, a second magnitude of the second load acting on the second fastener in the lateral direction based on the received second load sensor data.

17. The method of claim 16, wherein determining when the disk blade is bent comprises:
comparing, with the computing system, the first magnitude to a threshold value;
comparing, with the computing system, the second magnitude to the threshold value; and
determining, with the computing system, that the disk blade is bent when at least one of the first magnitude or the second magnitude exceeds the threshold value.

18. The method of claim 17, wherein:
the threshold value corresponds to a first threshold value; and
after it is determined that the disk blade is bent, the method further comprises:
comparing, with the computing system, the first magnitude to a second threshold value that is greater than the first threshold value; and
comparing, with the computing system, the second magnitude to the second threshold value.

19. The method of claim 18, further comprising:
initiating, with the computing system, notification of an operator of the agricultural implement immediately when at least one of the first magnitude or second magnitude exceeds the second threshold value; and
initiating, with the computing system, notification of an operator of the agricultural implement after the agricultural implement has reached an end of a pass across a field when the first magnitude and the second magnitude fall below the second threshold value.

20. The method of claim 15, wherein the control action comprises notifying an operator of the agricultural implement that the disk blade is bent.

* * * * *